(12) United States Patent
Lynn et al.

(10) Patent No.: US 6,221,521 B1
(45) Date of Patent: Apr. 24, 2001

(54) NON-COMBUSTIBLE GYPSUM/FIBER BOARD

(75) Inventors: Michael R. Lynn, Arlington Heights; Steven Blaine, Wood Dale, both of IL (US)

(73) Assignee: United States Gypsum Co., Chicago, IL (US)

( * ) Notice: Subject to any disclaimer, the term of this patent is extended or adjusted under 35 U.S.C. 154(b) by 0 days.

(21) Appl. No.: 09/222,202

(22) Filed: Dec. 29, 1998

Related U.S. Application Data

(60) Provisional application No. 60/073,503, filed on Feb. 3, 1998.

(51) Int. Cl.[7] .................................................. B32B 13/00
(52) U.S. Cl. ........................... 428/703; 428/70; 428/294.7
(58) Field of Search .................... 428/703, 70, 294.7, 428/297.1

(56) References Cited

U.S. PATENT DOCUMENTS

| | | | |
|---|---|---|---|
| 4,181,767 | 1/1980 | Steinau | 428/219 |
| 4,315,967 | 2/1982 | Prior et al. | 428/105 |
| 4,548,676 | 10/1985 | Johnstone et al. | 162/135 |
| 4,647,486 | 3/1987 | Ali | 428/70 |
| 5,041,333 | 8/1991 | Conroy | 428/312.4 |
| 5,135,805 | 8/1992 | Sellers et al. | 442/386 |
| 5,305,577 | 4/1994 | Richards et al. | 52/799 |
| 5,320,677 | 6/1994 | Baig | 106/780 |
| 5,342,566 | 8/1994 | Schafer et al. | 264/102 |
| 5,401,588 | 3/1995 | Garvey et al. | 428/703 |
| 5,601,888 | 2/1997 | Fowler | 428/34 |
| 5,637,362 | 6/1997 | Chase et al. | 428/15 |
| 5,858,083 | 1/1999 | Stav et al. | 106/735 |

FOREIGN PATENT DOCUMENTS

| | | | |
|---|---|---|---|
| 4222872 A1 | * | 2/1993 | (DE) . |
| 4142286A1 | | 7/1993 | (DE) . |
| 4404486A1 | * | 10/1994 | (DE) . |
| 2451428 | | 10/1980 | (FR) . |

OTHER PUBLICATIONS

Bahner, Braun & Kirsten—"Low–cost retrofitting of existing gypsum board lines to produce value–added gypsum–fiber products" (Date Unknown) pp. 90–96.

Sattler & Lempfer—"Gypsum–bonded particleboards and fiberboards" (Date Unknown) pp. 19–25.

Topf—"Combustion behavior of cement–, magnesia–, and gypsum–bonded boards" (1988) pp. 133–137; (No month).

Unknown Author—"Partial evaluation of the physical and fire resistance properties of ½" & ⅝" Gypsum Fiberboard Wallboard and ½" & ⅝" Standard Gypsum Wallboard Type X" (1987) 7 pages. (No month).

Natus—"Gypsum fiberboard production in Nova Scotia, Canada" Presented at the Second International Inorganic Bonded Wood and Fiber Composite Materials Conference held Oct. 15–17, 1990 (pp. 85–87).

* cited by examiner

Primary Examiner—Deborah Jones
Assistant Examiner—Stephen Stein
(74) Attorney, Agent, or Firm—Donald E. Egan; John M. Lorenzen; David F. Janci

(57) ABSTRACT

A non-combustible gypsum/fiber board comprises two surface layers and at least one core layer, wherein the surface layers comprise a gypsum composition that is reinforced with organic fibers, and the core layer comprises a gypsum composition containing no more than about 3% by weight of organic materials.

12 Claims, 4 Drawing Sheets

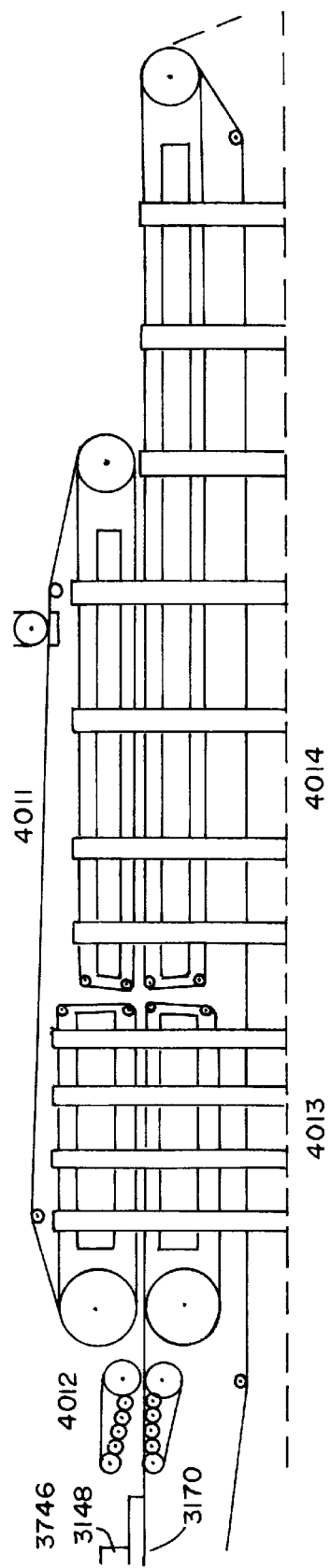

NON-COMBUSTIBLE GYPSUM/FIBER BOARD

This application claims the benefit of copending provisional application Ser. No. 60/073,503 filed Feb. 3, 1998.

BACKGROUND OF THE INVENTION

The present invention relates generally to a non-combustible "paperless" gypsum board that is reinforced with organic fibers and to a process for making such a gypsum/fiber board. More particularly, the present invention relates to a gypsum/fiber board that can qualify as a non-combustible building material as specified by various building codes (e.g. BOCA) when tested in accordance the ASTM E136 test procedure.

Conventional gypsum wallboard or panel is typically manufactured from a plaster slurry wherein a wet slurry of calcium sulfate hemihydrate, generally referred to as calcined gypsum, is placed between two layers of paper and the slurry is allowed a certain amount of time to set. The set gypsum is a hard and rigid product obtained when the calcined gypsum reacts with water to form calcium sulfate dihydrate. Calcined gypsum is either calcium sulfate hemihydrate ($CaSO_4 \cdot \frac{1}{2}H_2O$) or calcium sulfate anhydrite ($CaSO_4$). When calcium sulfate dihydrate is heated sufficiently, in a process called calcining, the water of hydration is driven off and there can be formed either calcium sulfate hemihydrate or calcium sulfate anhydrite, depending on the temperature and duration of exposure. When water is added to the calcined gypsum to cause the gypsum to set, in essence, the calcined gypsum reacts with water, and the calcined gypsum is rehydrated.

In typical gypsum wallboard, the two layers of paper contain the slurry and provide the strength required in installation and use. The wallboard is cut into discrete lengths to accommodate subsequent handling and then dried in heated dryers until the board is completely dry. The bending strength of the wallboard depends largely on the tensile strength of the paper. The gypsum serves as the core and accounts for fire resistance and moisture absorbing and moisture releasing activities. The paper determines the nature of the joint filler system and the surface treatment that may be used on the board.

Although paper-covered wallboard has many uses and has been a popular building material for many years, the prior art has recognized that for certain applications it would be advantageous to provide gypsum panel that did not rely on paper surface sheets for strength and other properties. Several prior art fiber-reinforced gypsum panels are as follows:

U.S. Pat. No. 5,320,677 to Baig, which is incorporated by reference herein in its entirety, describes a composite product and a process for producing the product in which a dilute slurry of gypsum particles and cellulosic fibers are heated under pressure to convert the gypsum to calcium sulfate alpha hemihydrate. The cellulosic fibers have pores or voids on the surface and the alpha hemihydrate crystals form within, on and around the voids and pores of the cellulosic fibers. The heated slurry is then dewatered to form a matt, preferably using equipment similar to paper making equipment, and before the slurry cools enough to rehydrate the hemihydrate to gypsum, the matt is pressed into a board of the desired configuration. The pressed matt is cooled and the hemihydrate rehydrates to gypsum to form a dimensionally stable, strong and useful building board. The board is thereafter trimmed and dried. The process described in U.S. Pat. No. 5,320,677 is distinguishable from the earlier processes in that the calcination of the gypsum takes place in the presence of the cellulosic fibers, while the gypsum is in the form of a dilute slurry, so that the slurry wets out the cellulosic fibers, carrying dissolved gypsum into the voids of the fibers, and the calcining forms acicular calcium sulfate alpha-hemihydrate crystals in situ in and about the voids.

U.S. Pat. No. 5,342,566 to Schafer et al, which is incorporated by reference herein in its entirety, refers to a method of producing fiber gypsum board comprising the steps of mixing in a preliminary mixing step predetermined amounts of fibers and water respectively, to form a mixture of wetted, loose fibers; mixing in a mixing step the wetted fibers with a predetermined amount of dry calcined gypsum; premixing an accelerator with one of the components of dry calcined gypsum, fiber and water; promptly laying the mixed composition into a matt; immediately degassing the matt in a first compression step, adding a predetermined amount of water onto the resultant matt; and immediately compressing the matt to form a board composed of bonded fibers and gypsum. This process may be used to produce either a homogeneous board or a multilayered composite board. For example, the board can have outer layers of the same composition and a lighter core containing a lightweight filler, such as perlite. The board is preferably reinforced by fiber, such as paper fiber, although less fiber is included in the core layer. Several heterogeneous layers of board forming materials are placed on each other before the board is fully formed, pressed, and dried and wherein each of the layers is identical in composition.

U.S. Pat. No. 5,135,805 to Sellers et al, describes a water resistant gypsum product that may be a "faceless" product, i.e. it may not include a facing sheet of paper, fiberglass mat or similar material. The gypsum products described by U.S. Pat. No. 5,135,805 typically contain reinforcing fibers, for example, cellulosic fibers, such as wood or paper fibers, glass fibers or other mineral fibers and polypropylene or other synthetic resinous fibers. The reinforcing fibers can be about 10 to about 20 wt. % of the dry composition from which the set gypsum product is made. The density of such a product is typicality within the range of about 50 to about 80 pounds per cubic foot.

Carbo et al Provisional Application Ser. No. 60/073,503, describes a tri-layer, paperless gypsum/fiber board and a process for making such a gypsum/fiber board, all of which is incorporated by reference herein in its entirety.

Conventional wall board is classified as a non-combustible building material as specified by various building codes (e.g. BOCA) when tested in accordance the ASTM E136 test procedure. The building code allows the removal of $\frac{1}{8}$ inch from both the top and bottom surface layers of the board in preparing the sample for the ASTM E136 test procedure. Conventional gypsum/fiber boards that are reinforced with organic fibers can not pass the E136 test because the presence of more than 3 or 4% of organic fibers in the core of the board render the board combustible. In the prior art, this problem was addressed through the use of non-combustible fibers, such as asbestos fibers, or by the inclusion of fire retarding agents such as aluminum trihydrate that reduced the amount of heat released during the test. Neither of these approaches produced satisfactory solutions.

Accordingly, it is yet a further object of the present invention to provide a gypsum/fiber board that is classified as a non-combustible building material as specified by various building codes (e.g. BOCA) when tested in accordance the ASTM E136 test procedure.

It is another object of the present invention to provide a building panel that has improved abuse resistance, better strength (MOR) in both directions and better nail pull strength as compared to conventional wall board.

SUMMARY OF THE INVENTION

The present invention relates generally to a non-combustible "paperless" gypsum board that is reinforced with organic fibers and to a process for making such a gypsum/fiber board. More particularly, the present invention relates to a gypsum/fiber board having a core preferably containing no more than about 2.0% organic material which board can qualify as a non-combustible building material as specified by various building codes (e.g. BOCA) when tested in accordance the ASTM E136 test procedure.

The term "paperless" gypsum/fiber board, as used herein, is intended to distinguish the fiber-reinforced gypsum panels to which the present invention relates from conventional prior art gypsum panels, which are referred to as "wall board" or "dry wall" which have at least one surface comprised of paper, including "wall board" or "dry wall" additionally having some form of fiber-reinforcement in the core.

The gypsum/fiber board of the present invention comprises three or more layers, wherein the two surface layers comprise a gypsum composition that is reinforced with organic fibers, preferably paper fibers, and wherein the core or central layers comprise a gypsum composition that contains no more than about 3% by weight of organic materials such a paper fibers and starch. Although the core may contain up to 2.4% of organic fiber and 0.6% starch, preferably the core contains no more than 1.4% of paper, including any paper that is present in recycled panel materials, and preferably contains no more than about 0.6% starch, including any starch that is present in recycled panel materials.

It is to be understood that the foregoing general description, and the following detailed description, are exemplary and explanatory only and are not restrictive of the invention, as claimed.

The accompanying drawings, which are incorporated in and constitute a part of the specification, illustrate several embodiments of the invention and together with the description, serve to explain the operation of the present invention.

BRIEF DESCRIPTION OF THE DRAWINGS

FIG. 4 is an illustration of a side view of a pressing area of a production line in accordance with the present invention.

DETAILED DESCRIPTION OF THE PRESENT INVENTION

Figure 1:
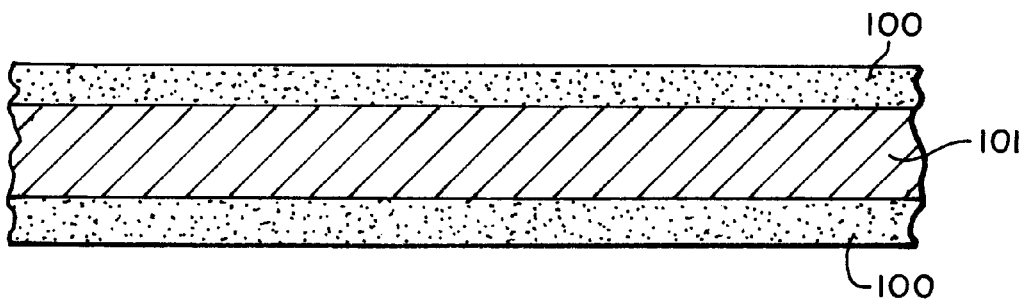
FIG. 1 is a sectional end view of a three-layer board of the present invention.

The present invention relates generally to a non-combustible "paperless" gypsum board that is reinforced with organic fibers and to a process for making such a gypsum/fiber board. More particularly, the present invention relates to a gypsum/fiber board that can be a non-combustible building material as specified by various building codes (e.g. BOCA) when tested in accordance the ASTM E136 test procedure.

The preferred embodiment of the gypsum/fiber board of the present invention comprises three or more layers, wherein the surface layers comprise a gypsum composition that is reinforced with organic fibers, preferably paper fibers and wherein the core or central layers comprise gypsum compositions that contain no more than about 3% by weight of organic materials, such a paper fibers and starch. Preferably, however, the core contains no more than about 2.0% of organic materials. More specifically, the core layer of the board of the present invention preferably contains no more than 1.4% of paper, including any paper that is present in recycled panel materials, and preferably contains no more than about 0.6% starch, including any starch that is present in recycled panel materials. As a practical matter, the trimmings and any scrap board produced during production is typically recycled into the core composition. Depending upon the level of recycled board in the core, the core composition may contain no fiber other than the fiber present in the recycled board.

The surface layers preferably both comprise the same composition, although different compositions may be used. Suitable compositions for the surface layers are shown below in Table 1.

TABLE 1

|  | Usable | Preferred | Best |
| --- | --- | --- | --- |
| Gypsum (dihydrate basis) | 70–90% | 80–90% | 82% |
| Paper fiber | 10–30% | 10–20% | 18% |
| Additives | 0–1.0% | 0–0.5% | 0.4% |

Paper fiber is the preferred organic fiber for use in the composition of the surface layers to reinforce the surface layers because of its cost and availability. Generally cellulosic fibers are preferably used for reinforcement because they give the best strength and they help in mixing the gypsum. The present invention contemplates using a variety of organic fibers from available waste products such as presorted waste paper, used newspaper, inexpensive household waste paper, rejected fibers of pulp production and waste wood fibers. The present invention also contemplates using a variety of inorganic fibers such as fiber glass or mineral wool.

The gypsum may be from any source including natural gypsum, chemical gypsum and FGD (flue gas desulphurization) gypsum. Preferably the gypsum is calcined to form beta-hemihydrate prior to use.

The additives include accelerators such as potassium sulfate or ground raw gypsum and other additives conventionally used in wall board such as wetting agents, dispersing agents, biocides, fungicides, waterproofing agents, and the like.

The core preferably comprises a single layer, although more than one layer may be used as the core of the board. Suitable core compositions are shown below in Table 2.

TABLE 2

|  | Usable | Preferred | Best |
| --- | --- | --- | --- |
| Gypsum (dihydrate basis) | 50-90% | 60-75% | 63% |
| Perlite | 10-50% | 30-40% | 36.4 |
|  | 0-2.5% | 0.5-0.8% | 0% |
| Starch | 0.5-1.5% | 0.5-0.8% | 0.6% |
| Other | 0-1.0% | 0-0.5% | 0.4% |

Preferably the core composition comprises gypsum, expanded perlite and very limited amounts of paper fiber and starch, although different compositions may be used. The same gypsum and additives used in the outer layers may be used in the core.

The perlite functions as a bulking agent and density modifier.

The amount of perlite used is a function of its density. Perlite having a density of from about 5 to 20 pounds per cubic foot may be used, although perlite having a density of 7 to 10 pounds per cubic foot is preferred because it tends to break less in the mixing process.

The starch forms a coating on the perlite. The starch is important because it serves as an internal bonding agent and bonds the layers together. The fiber in the core may also contribute to the bonding of the core to the outer layers.

Although cellulosic fibers from the recycled board that are generally present in the core composition provide some strength to the core, inorganic fibers such as fiber glass or mineral wool may be used to enhance the strength of the core.

The thickness of core of the board may vary over wide limits but the surface layers are preferably no more than about $1/8^{th}$ inch thick. It is contemplated that the core will comprise the balance of the thickness of the board.

Production of Tri-layer Gypsum Fiber Board

The present invention contemplates the formation of fiber-reinforced gypsum panel having two or more layers having distinct compositions 100 and 101 as illustrated in FIG. 1. The production line for making a multilayered board, having perlite and fiber and gypsum for the middle core, will first be described. The use of the methods and equipment to produce different boards according to the present invention will then be described.

Figure 3:
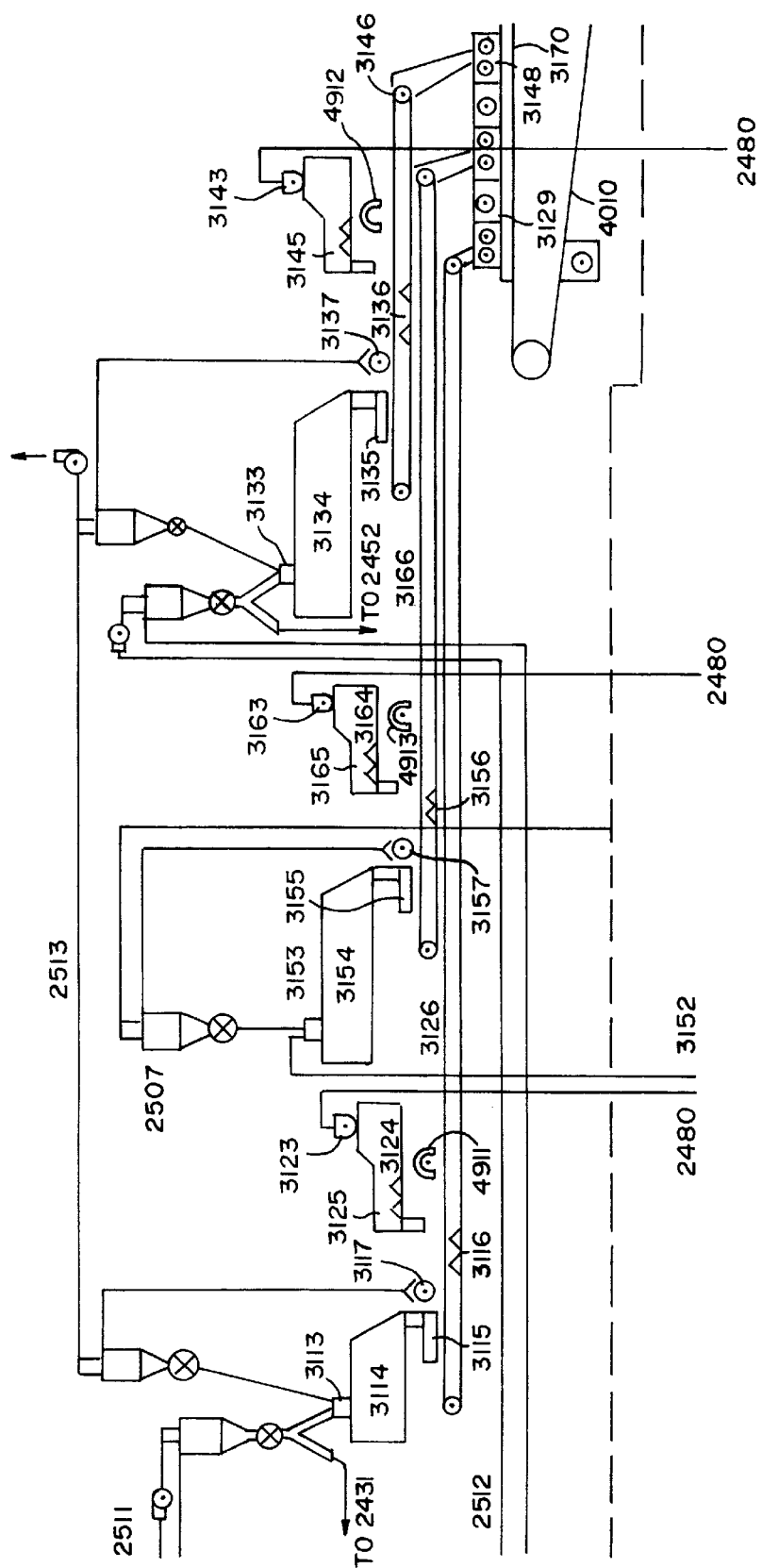
FIG. 3 is an illustration of a side view of a forming station of a production line in accordance with the present invention.

The formation of the board can be described with reference to FIG. 3 which shows three forming lines. Each forming line has three preforming belts 3126, 3166 and 3146 on which the wetted fibers and dry calcined gypsum with additives for the surface layers and wetted perlite fibers and dry calcined gypsum for the core layer are formed. With reference to the top and bottom surface layers, wet fiber from the mills (not shown) is carried by a closed loop pneumatic conveyor 2511, 2512 to the forming station where the fibers are separated from the air by a cyclone. The separated fibers are deposited into shuttle conveyors on the top of fiber formers 3114, 3134. The fiber formers spread via spreader heads 3115, 3135 a preselected amount of fiber, according to the weight ratio of a preferred recipe, onto the preforming belts 3126, 3136, forming a matt. The spreader heads preferably include a plurality of rollers that cause a uniform layer of fibers to be placed onto the preforming belts.

Immediately downstream of the spreader heads 3115 and 3135 are scalper rolls 3117 and 3137, respectively, which scrape off excess fiber and thereby equalize the thickness of the matt. The scalper rolls can be adjusted in height to ensure that the deposited matt of fibers has a uniform weight, and a vacuum is applied at the rollers to pneumatically draw off excess fibers. Fibers scraped off by the scalper rolls are recycled pneumatically by pneumatic conveyors 2513 and 2507 into the same shuttle conveyors on the top of fiber formers 3114 and 3134. The preforming belts operate at a constant speed.

The dry calcined gypsum additive mixture from distribution bin (not shown) is fed to plaster forming bins (not shown). The plaster, as explained below, is predominately calcined gypsum, although the plaster may include other conventional additives to control the chemical process. The gypsum is metered from the forming bins by conventional means, such as conveyors, chutes, or rollers. The bins have a variable speed bottom belt conveyor with an integrated matt scale 3125, 3145 to control the amount of plaster deposited on the preforming belt depending on the recipe. The correct amount of plaster is added as a top layer onto the fiber matt.

At the head section of the preforming belts, the fiber plaster layer is guided downward onto mixing heads 3129 and 3148. The mixing heads comprise sets of spike rollers (not shown) which thoroughly mix the fiber and plaster into a homogeneous composition and carry the mixture from the head of the preforming belt (infeed) to the outfeed of the mixing head onto the forming belt 4010. Depending upon the distance from the preforming belt head to the mixing head, a series of spike rolls controls the downward motion of the material.

Figure 2:
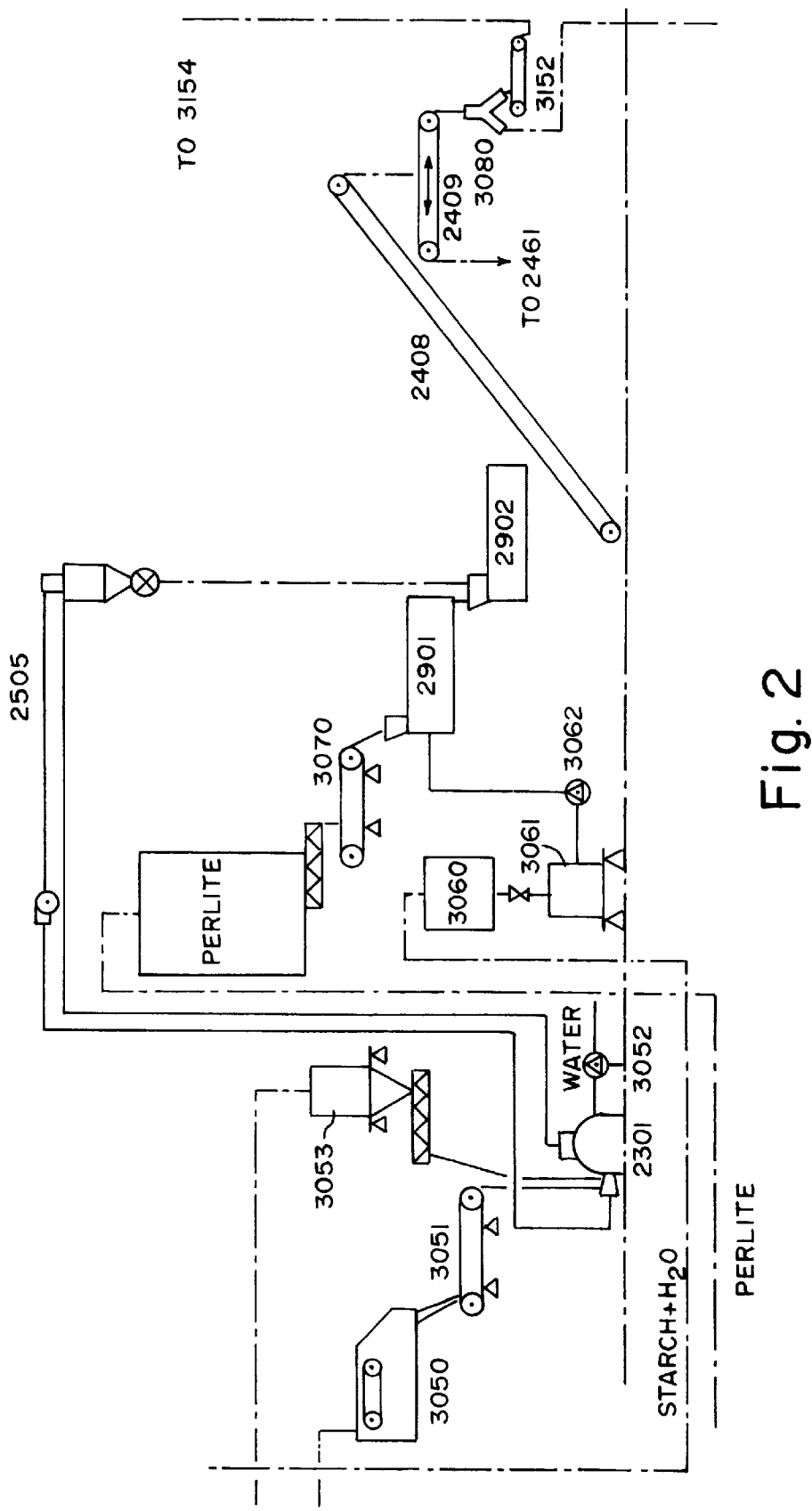
FIG. 2 is an illustration of a side view of the core layer material preparation area of a production line.

FIG. 2 illustrates the mixing of the core composition. The starch solution is coated on the perlite in mixer 2901. Any fiber added to the core composition is mixed with the perlite in mixer 2902. The core layer is formed in a similar manner to that of the surface layer. In the example being described, less fiber is included in the core layer because a volume of expanded perlite is used in the core layer. Expanded perlite is included in the core layer to reduce the overall specific weight of the board. The expanded perlite in combination with the gypsum provide a non combustible material which enables the core to pass the ASTM E136 test procedure. Preferably, the mixture of wetted paper fibers and perlite particles are moisturized so that they will carry the water necessary to hydrate the plaster to optimum strength added to form the core layer. As explained below, in the preferred embodiment an adhesive, preferably liquid starch, is first mixed with the water for moistening the perlite, and the fibers are separately mixed with water. The wetted fibers and wetted perlite are then mixed together to form a uniform mixture.

Referring again to FIG. 3, a wetted perlite, starch and fiber mixture (from conveyor not shown) is deposited in fiber former 3154, which is identical in structure and operation to formers 3114, 3134. The perlite, starch and fiber mixture is deposited onto preforming belt 3166 through spreader head 3155, in the same manner as the board surface layers. Preforming belt 3166 layers the perlite, starch and fiber mixture from fiber former bin 3154 with the plaster from forming bin 3164 and delivers the components to a mixing head 3168. Forming bin 3164 includes an integrated matt scale 3165. The core layer forming line includes a scalper roller 3157, matt scales 3156, and a mixing head 3168 that operate in the same manner as the elements in the surface forming line.

Following the formation of the matt on the forming belt 4010, the three layered matt is pressed by a press line, shown in FIG. 4. In one embodiment, the forming belt 4010 is also part of the press line and extends through the press and calibrating sections. In another embodiment (not shown), the forming belt ends at the degassing station 4012 of the press line, so that there is an open gap between the degassing station and the compression station. Behind the last compressing roller of the degassing station, spraying nozzles are installed for adding additional water for moistening the surface layers of the matt from both sides.

The press line includes three main sections, the degassing station 4012, the compression station 4013, and the calibration station 4014. These stations can be adjusted to vary the spacing between the conveyor belts as well as the pressure being applied to the matt or gypsum, fibers, additives, and other materials. The adjustment of the station, therefore, allows the user to vary the thickness of the board.

Initially, the matt is pre-compressed by the degassing station 4012 to remove air from the matt. For a standard board, this station reduces the matt from a thickness of several inches close to the final thickness that can vary, e.g. from ⅜ to ¾ inch. Next, the degassed matt is pressed in compression station 4013 where the matt is subject to a high load and pressed to the final board thickness. The matt then goes through calibration station section 4014 which holds the thickness of the board to allow the setting process to continue.

After pressing and prior to drying, the boards are cut and prepared to enter the dryers. The boards, which are formed and pressed endlessly, are pre-trimmed and cut into e.g. 24 foot long pieces. High-pressure water jets may be used to cut and trim the board. For example, 2 stationary jets may be used to trim the sides, while a moving water jet cross cuts the board to length. While in the cutting area and immediately prior to, the board is supported by a conveyor belt that lifts the board but does not provide forward motion. Alternatively airjets or similar means (not shown) may provide an air cushion as is well known in the art. Belt conveyors 3176, 3177 accelerate the board to a high conveying speed.

The dryer is preferably equipped with three setting zones before the first drying zone. The drying section of the production line is well known in the art and therefore will not be discussed in any detail.

Noncosmustible Board

In a preferred embodiment, a three layer fiber-reinforced board is produced with a core having a relatively low content of organic material in order to qualify as a noncombustible building material as specified by various building codes (e.g. BOCA) and as tested according to ASTM E136. The improved fiber-reinforced board of the present invention achieves a noncombustible rating because the core of the board is noncombustible and the building code allows the removal of ⅛" from both the top and the bottom surface layers of the board prior to combustion testing. With the removal of the surface layers containing relatively high levels of paper fibers, the remaining portion, the core, becomes noncombustible. Prior art fiberboards were relatively noncombustible because they employ noncombustible fiber such as asbestos and minerals such as aluminum trihydrate, which reduces the heat released during the combustion test. The board of the present invention achieves a noncombustible rating because the composition of the core contains a total of not more than about 2% organic materials, including a nominal 0.6% starch sprayed onto the perlite, and a paper content not exceeding 1.4% including paper from clips (fiber) and paper from recycled panel materials. However, the board of the present invention has high strength that is provided by the paper fiber content in the surface layers.

In this embodiment, the composition, in percent by weight, of the three layers is shown below in Table 3, including bottom surface layer ("SLB"), the top surface layer ("SLT"), and the center, core layer ("CL").

TABLE 3

| COMPONENT | SLB | SLT | CL |
|---|---|---|---|
| Paper Fiber | 18% | 18% | 1.4% |
| Plaster | 82% | 82% | 62% |
| Perlite | 0 | 0 | 36% |
| Starch | 0 | 0 | 0.6% |

EXAMPLE

Composite paperless fiber reinforced gypsum panels are produced in the following manner. Calcined gypsum (calcium sulfate hemihydrate) is blended with recycled paper fibers, expanded perlite, starch, water and potassium sulfate to form a three-layer board. Three formulations of fiber and gypsum, shown below in Table 4, are prepared for use as the bottom surface layer ("SLB"), as the top surface layer ("SLT"), and as the center layer ("CL"). All of the formulations shown in table 4 include a portion of recycled board. The only fiber used in the center layer is the fiber from recycled board. These formulations are used to prepare a 3-layer gypsum/fiber board ⅝ inches thick, using the continuous process and apparatus described above under the heading "MULTI-LAYER GYPSUM FIBER BOARD" at the rates shown in Table 4.

TABLE 4

| COMPONENT | SLB | SLT | CL |
|---|---|---|---|
| Fiber | 18% | 18% | 1.4% |
| Stucco | 70.5% | 70.5% | 52.8% |
| Raw Gypsum | 0.4% | 0.4% | 0.3% |
| $K_2SO_4$ | 0.6% | 0.6% | 0.4% |
| Perlite | 0 | 0 | 36.6% |
| Starch | 0 | 0 | 0.6% |
| Water | 10.5% | 10.5% | 7.9% |

The fiber used is a scrap paper fiber. The "stucco" is about 97% calcium sulfate hemihydrate, the balance being inert impurities. The stucco requires 18% by weight of water to form the complete hydrate. The resulting three-layer board is ⅝ inches thick and has a density of 55 pounds per cubic foot of which the center layer is 44% and the surface layers 28% each. Owing to the relatively low paper content of the center layer, the resulting gypsum/fiber board is classified as a non-combustible building material as specified by various building codes (e.g. BOCA) when tested in accordance the ASTM E136 test procedure. Yet the board has high overall strength because of the high paper fiber content of the surface layers.

The board produced in accordance with the Example set forth above was tested and the test data was compared to test data from five other three-layer gypsum/fiber boards. The fiber, starch and total organic content of the core layers are shown in the first three lines of Table 5. The test data is reported in Table 5, below:

TABLE 5

|  | Control | A | B | C | D | E |
|---|---|---|---|---|---|---|
| Fiber % | 8.0 | 1.4 | 1.9 | 2.2 | 2.3 | 0.0 |
| Starch % | 0.5 | 0.6 | 0.5 | 0.00 | 0.00 | 0.60 |
| Total Organic % | 8.50 | 2.0 | 2.4 | 2.2 | 2.3 | 0.60 |
| Thickness | 0.626 | 0.621 | 0.621 | 0.630 | 0.627 | 0.623 |
| Density #/ft$^3$ | 55.5 | 56.5 | 56.5 | 55.5 | 54.7 | 56.7 |
| Moisture % | 0.70 | 1.12 | 0.66 | 0.55 | 0.97 | N/a |
| MOR (psi) | 865 | 752 | 910 | 787 | 764 | 645 |
| Internal Bond (psi) | 55 | 54 | 47 | 33 | 42 | N/a |
| ASTM E 136 (% pass) | 0 | 67 | 50 | 0 | 0 | 100 |

The test data in Table 5 was based on boards with core layer organic contents as shown below:

"Control" Standard Production (A commercial product similar to the board of Schafer U.S. Pat. No. 5,342,566 Col. 17, except the standard product has only 18% fiber in the surface layers and the fibers are not milled-with calcium oxide.)

Board A Board made in accordance with Example (See Table 4).

| Board B | 2.5% total organic (Fiber + Starch). |
| Board C | 2% total organic (Fiber w/o Starch). |
| Board D | 2.5% total organic (Fiber w/o Starch). |
| Board E | 0.6% total organic (Starch w/o Fiber). |

All of the test boards, other than Board E, contained a small quantity of recycled board. Table 5 shows the total formulations, including both the virgin materials and the recycled board.

The forms of invention shown and described herein are to be considered only as illustrative. It will be apparent to those skilled in the art that numerous modifications may be made therein without departing from the spirit of the invention and the scope of the appended claims.

We claim:

1. A gypsum/fiber board comprising two surface layers and at least one core layer, said surface layers comprising a gypsum composition that is reinforced with organic fibers, and said core layer comprising a gypsum composition containing no more than about 3% by weight of organic materials.

2. The gypsum/fiber board described in claim 1, wherein said organic fibers comprise paper fibers.

3. The gypsum/fiber board described in claim 1, wherein said core layer composition comprises expanded perlite.

4. The gypsum/fiber board described in claim 1, wherein said core layer contains no more than about 2.4% by weight of cellulosic fibers.

5. The gypsum/fiber board described in claim 1, wherein said core layer composition contains no more than about 2% by weight of organic materials.

6. The gypsum/fiber board described in claim 1, wherein said core layer composition contains no more than about 1.4% by weight of cellulosic fibers.

7. The gypsum/fiber board described in claim 1, wherein said core layer contains no more than about 0.6% by weight of starch.

8. The gypsum/fiber board described in claim 1, wherein said core layer comprises about 44% by weight of the board.

9. The gypsum/fiber board described in claim 1, wherein said core layer comprises about 36% by weight of expanded perlite, about 62% of gypsum dihydrate, up to 1.4% of paper fiber and up to 0.6% by weight of starch.

10. The gypsum/fiber board described in claim 1, wherein said surface layers comprise about 18% by weight paper fiber and about 82% by weight gypsum dihydrate.

11. The gypsum/fiber board described in claim 1, wherein said surface layers comprise the same composition.

12. The gypsum/fiber board described in claim 1, wherein said surface layers are no more than about $\frac{1}{8}^{th}$ inch thick.

* * * * *